(12) United States Patent
Janney et al.

(10) Patent No.: US 6,968,114 B2
(45) Date of Patent: Nov. 22, 2005

(54) CLADDING FOR HIGH TEMPERATURE OPTICAL COMPONENT AND METHOD OF MAKING SAME

(75) Inventors: Mark A. Janney, Hendersonville, NC (US); Russell G. May, Blacksburg, VA (US); Stephen D. Nunn, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 10/417,534

(22) Filed: Apr. 17, 2003

(65) Prior Publication Data

US 2004/0208470 A1 Oct. 21, 2004

(51) Int. Cl.[7] ........................ G02B 6/02; H01L 21/205
(52) U.S. Cl. ................ 385/144; 385/123; 385/128; 385/78
(58) Field of Search .................. 355/123, 125, 355/78; 356/72, 128, 441, 336, 436; 250/231.11; 128/667; 73/722, 705

(56) References Cited

U.S. PATENT DOCUMENTS

| 5,381,229 | A | | 1/1995 | Murphy et al. |
| 5,526,112 | A | * | 6/1996 | Sahagen ...................... 356/72 |
| 5,709,473 | A | | 1/1998 | Sultan et al. |
| 6,109,783 | A | | 8/2000 | Dobler et al. |
| 6,226,453 | B1 | | 5/2001 | Yam et al. |

OTHER PUBLICATIONS

C. K. Kuo et al, "A Sodium–B–A1203 Coating Grown on a Sapphire Element," Solid State Ionics, 80, 167–70 (1995).

Sureth K. Sampath et al, "'Optical properties of Zinc Aluminate, Zinc Gallate, and Zinc Aluminogallate Spinels," J. Am. Ceram. Soc., 81 (3) 649–54 (1998).

* cited by examiner

Primary Examiner—John R. Lee
Assistant Examiner—David A. Vanore
(74) Attorney, Agent, or Firm—Joseph A. Marasco

(57) ABSTRACT

An optical waveguide includes a sapphire body having thereon a cladding containing spinel.

7 Claims, 9 Drawing Sheets

CLADDING FOR HIGH TEMPERATURE OPTICAL COMPONENT AND METHOD OF MAKING SAME

The United States Government has rights in this invention pursuant to: contract no. DE-AC05-00OR22725 between the United States Department of Energy and UT-Battelle, LLC; and contract no. F40600-00C-0010 between the United States Air Force and Prime Photonics, Inc.

FIELD OF THE INVENTION

The present invention relates to optical waveguides, and more particularly to sapphire optical waveguides having an aluminate spinel phase cladding.

BACKGROUND OF THE INVENTION

Commercially available sapphire fiber waveguides generally comprise thin cylindrical single crystal sapphire filaments without optical claddings. The wave-guiding structure is formed by the sapphire core and the surrounding air, which functions as an equivalent cladding. Due to the large refractive index difference between the sapphire fiber and the air, such waveguides are generally characterized by a very large numerical aperture (NA), a high degree of multimode transmission, and high sensitivity to bending. Moreover, the intensity of the optical signal propagating in the waveguide can be easily affected by changes in the surrounding atmosphere, such as refractive index variations and physical contacts, which are unavoidable in many applications. These problems make the fabrication of sapphire fiber sensors extremely difficult. For example, the highly multimodal nature of conventional sapphire fibers necessitates a precision of angular alignment of the sapphire fiber to an order of 0.1 degrees in sapphire fiber interferometers while communication-grade silica fiber-based interferometry requires a precision of only several degrees.

Cladding of an optical fiber is defined as: one or more layers of material of lower refractive index, in intimate contact with a core material of higher refractive index. Source: Federal Standard 1037C, Telecommunications: Glossary of Telecommunication Terms; Date of Publication: Aug. 7, 1996.

Materials and processes to produce suitable claddings on single crystal sapphire optical fiber waveguides are needed to reduce or eliminate all of the problems mentioned above. Single crystal sapphire fiber optic sensors and other sapphire waveguide structures require development of suitable cladding materials.

OBJECTS OF THE INVENTION

Accordingly, objectives and advantages of the present invention include the provision of a sapphire optical waveguide having an optical cladding with the following characteristics:

Pre-selectable average refractive index between 1.70 and 1.85

Cubic crystal structure (index of refraction independent of direction in the crystal)

Good adhesion to the sapphire fiber

Chemically stable at high temperatures (1500° C. and higher in many cases)

Able to withstand thermal shock

Low optical attenuation

Further and other objectives of the present invention will become apparent from the description contained herein.

SUMMARY OF THE INVENTION

In accordance with one aspect of the present invention, the foregoing and other objects are achieved by an optical waveguide that includes a sapphire body having thereon a cladding containing spinel.

In accordance with another aspect of the present invention, a method of fabricating an optical waveguide includes the steps of: contacting a sapphire body with a material that will form spinel when reacted with sapphire; and causing at least a portion of the sapphire to react with the material to form a cladding containing spinel.

BRIEF DESCRIPTION OF THE DRAWINGS

FIG. 6b is a magnified view of a portion of FIG. 6a.

FIG. 7b is a magnified view of a portion of FIG. 7a.

Figure 1A:
FIGS. 1a, 1b, and 1c are photomicrographs of test waveguides of the present invention made with dip-coated slurries of $MgO/MgAl_2O_4$ in respective ratios of 100/0, 75/25, and 50/50.

For a better understanding of the present invention, together with other and further objects, advantages and capabilities thereof, reference is made to the following disclosure and appended claims in connection with the above-described drawings.

DETAILED DESCRIPTION OF THE INVENTION

In accordance with the present invention, the general approach to cladding sapphire bodies (usually fibers, but can be any size or shape) for high-temperature applications is to convert an outer portion (reaction layer) of the original sapphire material to a new phase that has the appropriate optical, chemical, thermal and mechanical properties to be useful as a cladding. Spinel was found to be an excellent base material for such cladding. The scope of the present invention includes spinels in general as cladding materials for sapphire waveguides. Spinels are defined generally as $AB_2O_4$ where A may include at least one of Mg, ferrous Fe, Zn, Co, Cr, Cu, Ga, Mg, Mn, Ni, Sr, and B may include at least one of Al, ferric Fe, and Cr.

In some embodiments of the present invention, magnesium aluminate and/or strontium aluminate spinel cladding can be produced by exposing the sapphire fiber to a vapor source of magnesium and/or strontium at a temperature sufficient for a reaction to form spinel.

EXAMPLE I

A sapphire fiber was inserted into a MgO tube, which was subsequently heated to approximately 1800° C. A cladding of $MgAl_2O_4$ spinel formed on the surface of the sapphire fiber. The thickness of the spinel coating was <5 μm.

EXAMPLE II

A sapphire fiber is inserted into a SrO tube, which is subsequently heated to approximately 1800° C. A cladding of $SrAl_2O_4$ spinel forms on the surface of the sapphire fiber.

In order to produce a thicker cladding, a different technique was developed. A sapphire fiber is dip coated in a suspension (slurry) of MgO or a mixture of MgO and spinel powders, preferably followed by at least partial drying of the coating. Several successive dip coats may be preferable to a single dip coat.

After dip coating is complete, the coated fiber is fired at a temperature sufficient to react the MgO powder with the sapphire fiber and to densify the coating. The overall reaction for the process is expressed generally as:

$$MgO+Al_2O_3=MgAl_2O_4 \quad \text{(Equation 1)}$$

The reaction proceeds rapidly at a most preferable temperature of 1750° C. It is contemplated that temperatures in the range of 1500–2050° C. are also preferable. At lower operable temperatures, e.g., 1400° C., the reaction may proceed more slowly; higher temperatures are prohibited by the melting point of sapphire. Time of exposure to a particular temperature will have various effects.

Any slurry composition can be used that is compatible with dip coating, drying, and firing of sapphire fibers. One suggested slurry composition comprises a 20 vol % solids suspension of isopropyl alcohol (90.2 wt. %), propylene glycol methyl ether (8.2 wt. %), polyvinylpyrrollidone (1.2 wt. %, 10,000 MW), and polyethylene glycol 200 (0.4 wt. %) to form a suspension having flow properties appropriate for a coating operation. Isopropanol is the primary solvent for the suspension, propylene glycol methyl ether is a drying control solvent which dries much slower than the isopropanol, polyvinylpyrrollidone is a dispersant which helps de-agglomerate the powders and also acts as a temporary binder in the green state, and polyethylene glycol is a plasticizer for the polyvinylpyrrollidone. Composition of the slurry is not critical to the invention, but can be optimized to obtain the best results for a particular application of spinel-clad sapphire waveguide.

Varying ratios of MgO and spinel were selected to investigate the effect of the amount of reaction between the coating and the sapphire substrate on the type of cladding formed, its thickness, and its microstructure. The following were found:

1. The more spinel in the initial coating, the lower the degree of reaction.
2. The spinel particles might provide seeds for crystal growth of the spinel formed by the reaction of MgO with sapphire, which would in turn affect the microstructure of the spinel cladding.

EXAMPLE III

Suspensions were made using four different blends of $MgO/MgAl_2O_4$ in the weight ratios of 100/0, 75/25, 50/50, and 25/75. The powders were mixed by ball milling 62 g of each powder blend in 80 ml of a slurry as described hereinabove. Fibers were dip coated with a single dip in the suspensions and dried in air. In the most useful cases, multiple dip coatings were used. The coated, dried fibers were fired at 1750° C. for 30 minutes in ultrahigh purity argon in a tungsten element furnace. All of the samples formed a dense, adherent cladding of spinel on the sapphire. The thickness of the cladding formed was similar for all of the samples. The 75/25 $MgO/MgAl_2O_4$ mixture was selected for further testing because it was judged to have the best overall appearance.

Figure 1B:
Figure 1C:
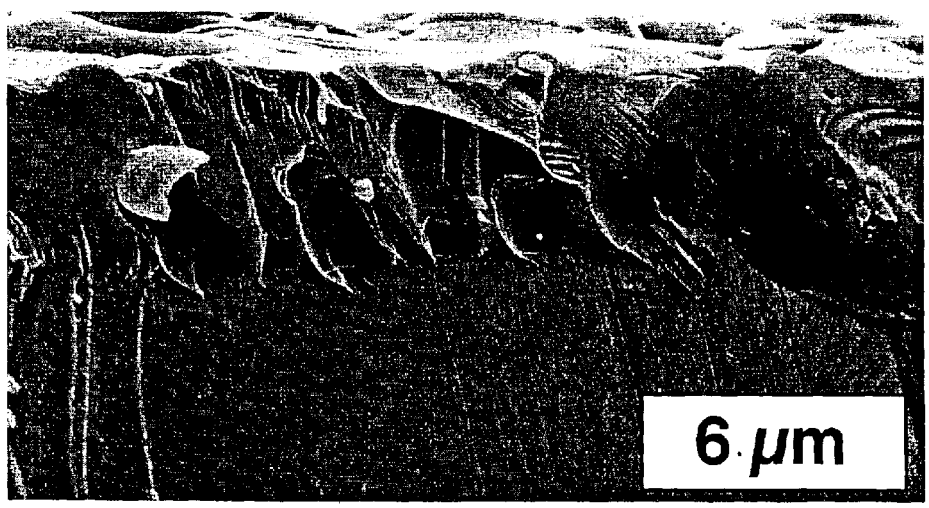

FIGS. 1a, 1b, and 1c are photomicrographs of test waveguides of the present invention made as described in Example III with dip-coated slurries of $MgO/MgAl_2O_4$ in respective ratios of 100/0, 75/25, and 50/50.

The effect of slurry coating thickness on cladding formation was investigated.

EXAMPLE IV

Samples were fabricated using one, two, four and eight dip coatings to produce varying thickness of coatings on the fibers. Spinel cladding was formed as described in Example III.

Figure 2A:
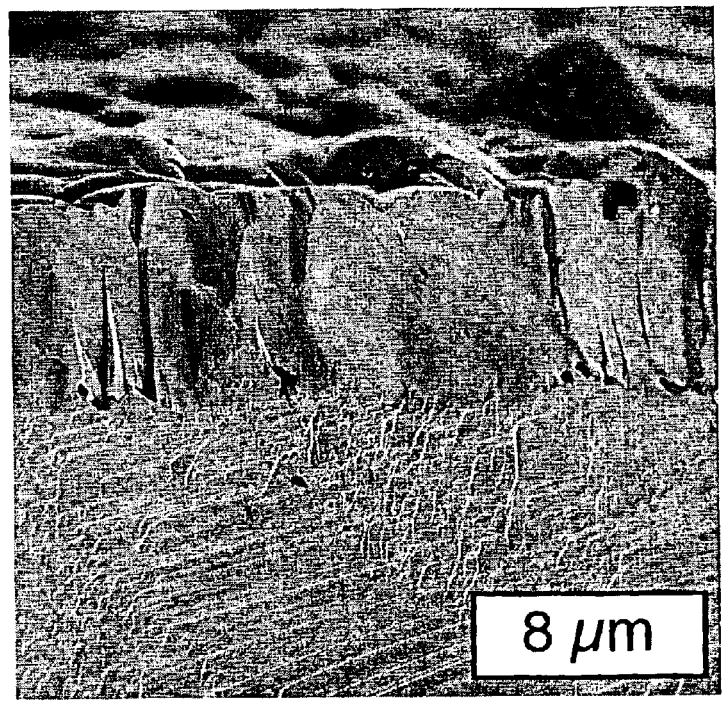
FIGS. 2a, 2b, 2c, and 2d are photomicrographs of test waveguides of the present invention made with, respectively, one, two, four, and eight dip-coatings of a slurry of $MgO/MgAl_2O_4$ in a respective ratio of 75/25.
Figure 2B:
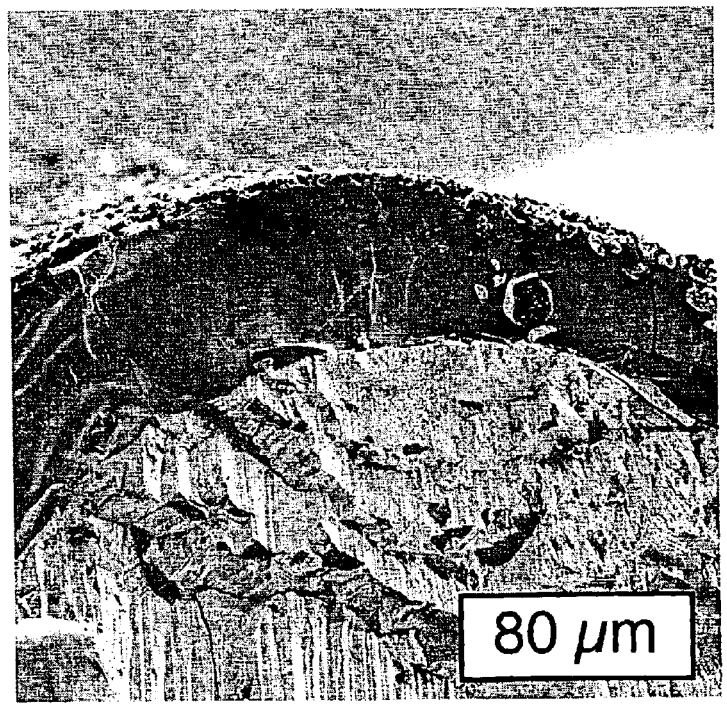
Figure 2C:
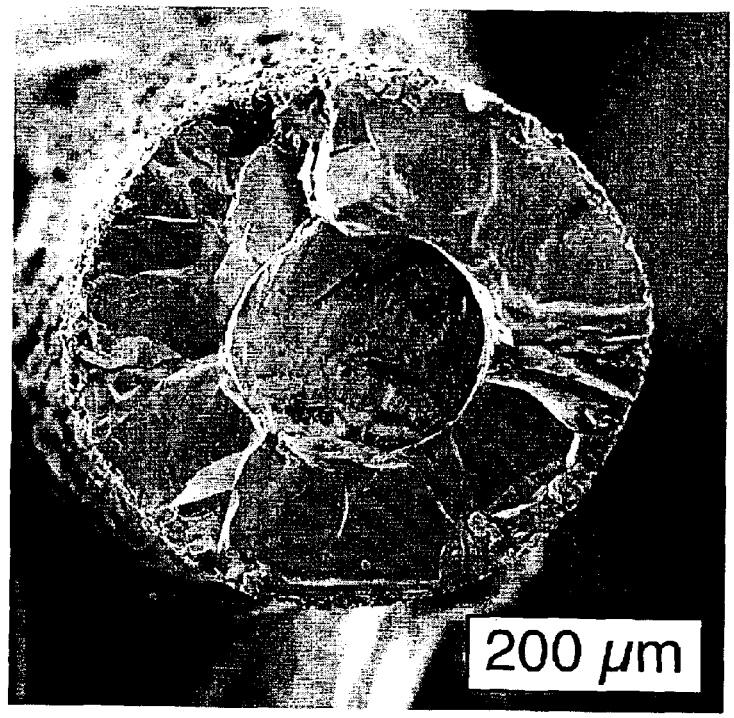
Figure 2D:
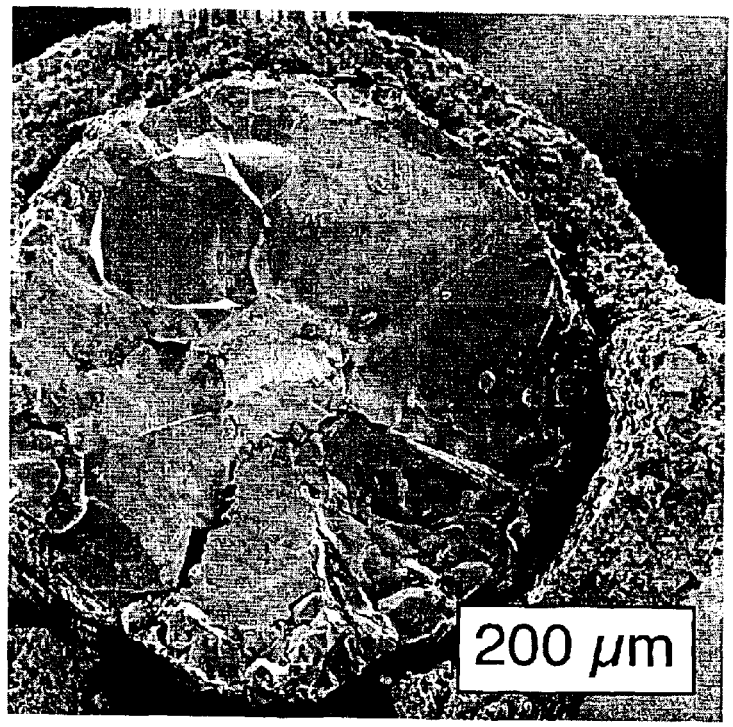

The results of the samples fabricated as described in Example IV are shown in FIGS. 2a–d. All of the samples have a characteristic core-cladding geometry. The single-crystal sapphire core is easily differentiated from the spinel cladding by its distinctive cleavage steps. The thickness of the spinel coating developed on a sapphire fiber was determined by the number of slurry coats put on in the green state. One dip coat produced a spinel coating about 5–6 μm thick, as shown in FIG. 2a. Two and four dip coats produced spinel coatings of about 40 μm thick and about 100 μm thick, respectively, as shown in FIGS. 2b and 2c, respectively. Eight coats converted nearly the entire fiber to spinel, as shown in FIG. 2d.

The progress of the conversion reaction is clearly toward the center of the fiber, which is expected since the only source of alumina for the MgO to react with is the sapphire fiber itself. The initial sapphire fiber is about 400 μm in diameter. For example, in the sample with four dip coatings, the sapphire core is reduced to about 200 μm diameter, as shown in FIG. 2c.

Figure 3:
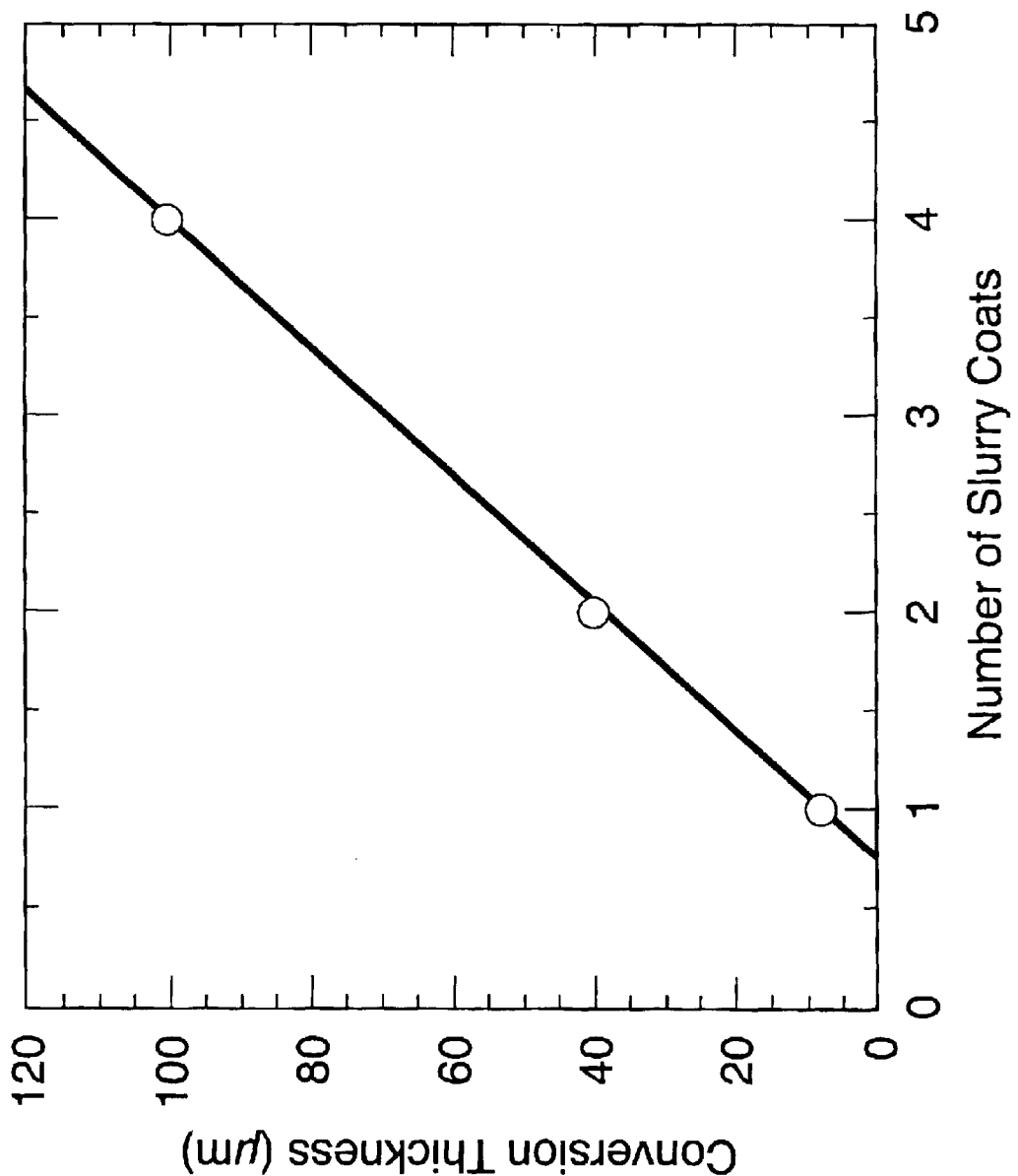
FIG. 3 is a graph showing the linearity of effect of multiple dip coats of slurry on cladding thickness in accordance with the present invention.

Data in FIG. 3 shows that the sapphire conversion thickness increased linearly with the number of slurry dip coats on the sapphire fiber. Thickness of the remaining sapphire fiber is generally inversely proportional.

Thickness of the spinel cladding can also be controlled by the composition of the slurry, for example, concentration of reactive constituents, solids loading, and viscosity. Viscosity in particular will be a factor in determining the amount of slurry deposited on the fiber with each dip coat.

Figure 4:
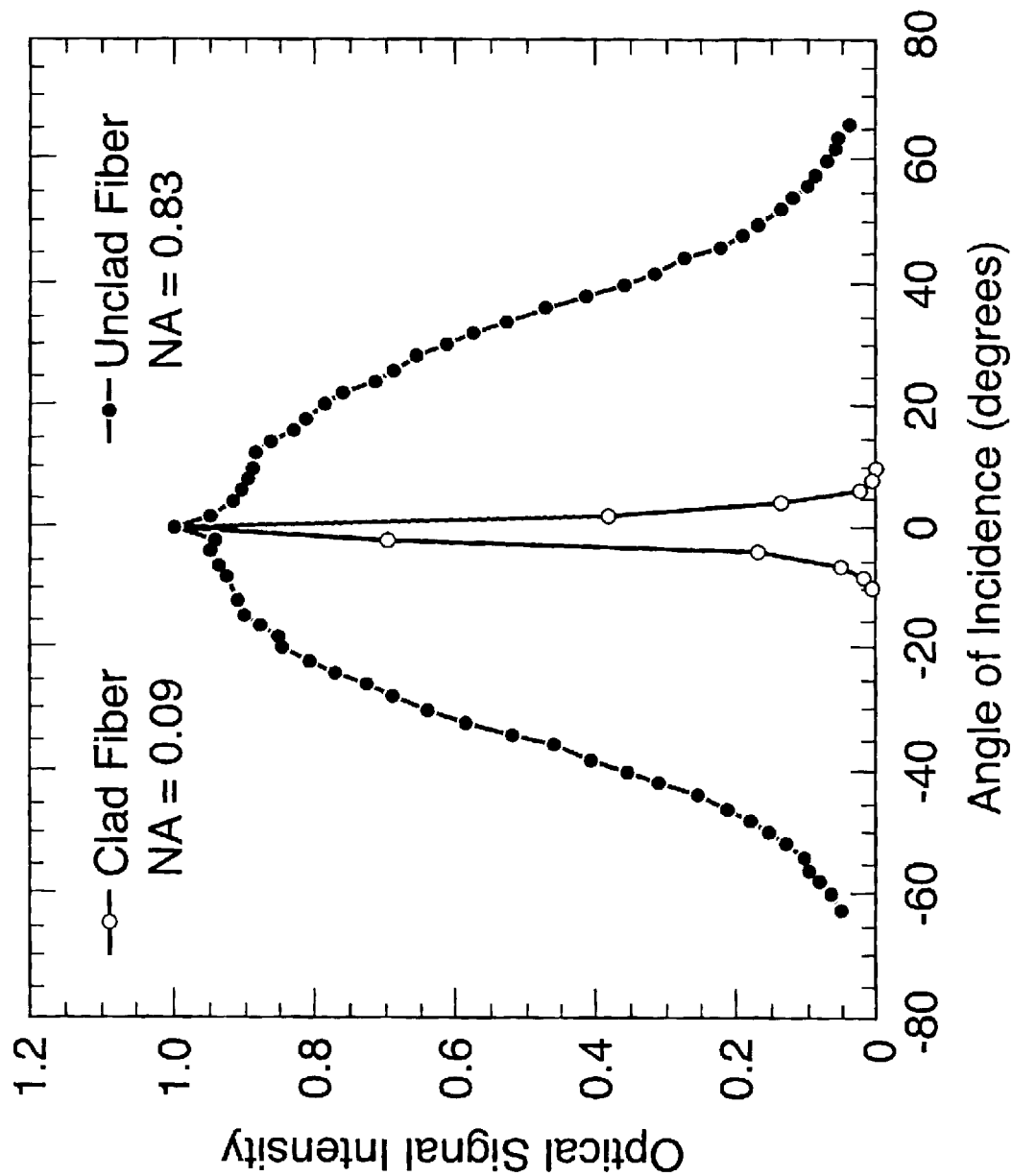
FIG. 4 is a graph showing normalized transmitted light intensity through spinel-clad and unclad 425-$\mu$m diameter sapphire fiber.

Samples of fibers clad in accordance with the present invention were tested for numerical aperture and compared with that of unclad fibers. FIG. 4 shows normalized transmitted light intensity through spinel-clad and unclad 425-μm diameter sapphire fiber. The spinel-clad fiber is characterized by a numerical aperture (NA) of 0.09, while the unclad fiber is characterized by a numerical aperture of 0.83. It is well known that the number of modes is generally directly proportional to the numerical aperture.

A single mode waveguide fiber would be ideally suited for many sensor applications. The spinel-clad sapphire waveguide of the present invention provides a way of approaching that goal, and even reaching it. The number of modes that an optical fiber (having a step index between core and cladding) can support is determined by the numerical aperture of the fiber and the diameter of the core, as shown by the approximate expression:

$$N \approx V^2/2 = (2\pi a/\lambda)NA \qquad \text{(Equation 2)}$$

where:

N=number of guided modes

V=normalized frequency (V-number)

a=core diameter

λ=wavelength

NA=numerical aperture

For a given core/cladding system (such as the sapphire/spinel system of the present invention), the core diameter controls the number of modes that can propagate through the fiber. Since, as shown and described hereinabove, one can control the core diameter, one can also control the number of modes that propagate through the fiber.

Spinel solid solution compositions are suitable for the present invention in like manner. Binary and ternary compositions were tested.

EXAMPLE V

Sapphire fibers were clad as described hereinabove using binary mixtures of $MgAl_2O_4/ZnO$ and ternary mixtures of $MgO/MgAl_2O_4/ZnO$. The powders were mixed at a weight ratio of 37.5/25/75.74 ($MgO/MgAl_2O_4/ZnO$), which is essentially equivalent to a 75/25 ratio of $MgO/MgAl_2O_4$ used in the experiments described earlier (after corrections are made for the molecular weight of ZnO relative to MgO).

Figure 5A:
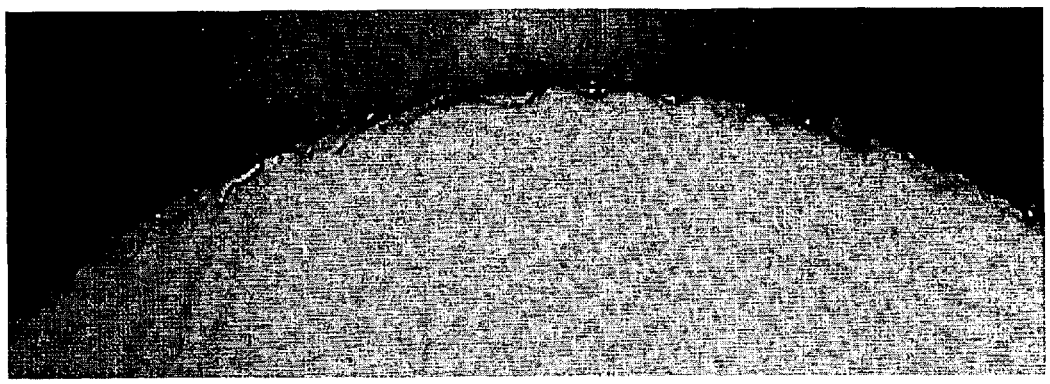
FIGS. 5a, 5b, and 5c are photomicrographs of MgO/ZnO spinel coatings on sapphire fiber showing mixed-spinel (MgO/ZnO aluminate) cladding formation.
Figure 5B:
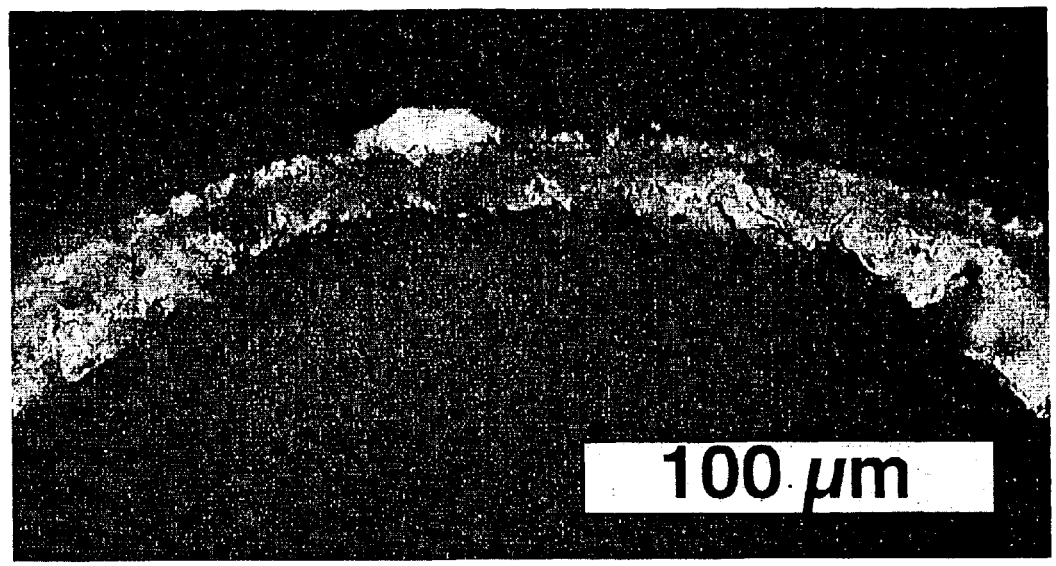
Figure 5C:
Figure 6A:
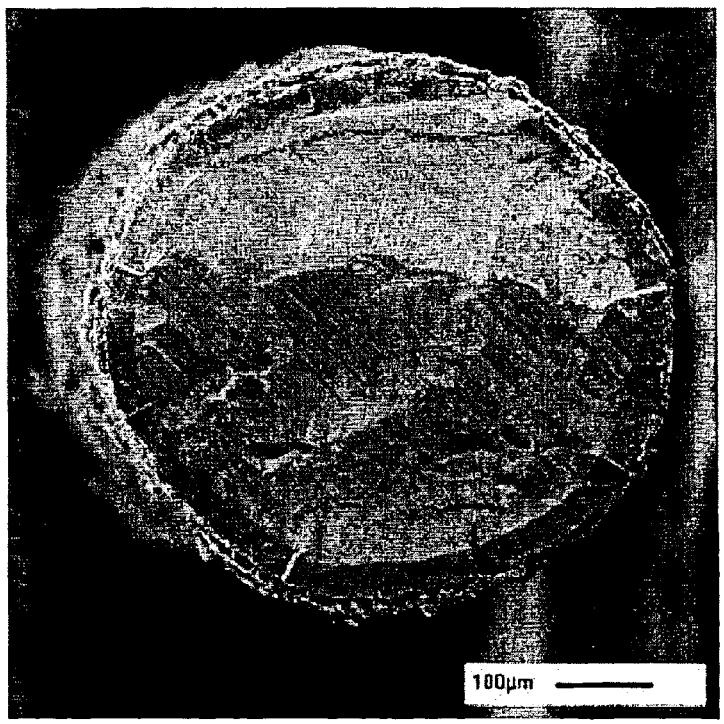
FIG. 6a is a scanning electron photomicrograph of a clad sapphire fiber of the present invention made by pack cementation at 1434° C. in argon for 2 hours using a pack composition of $MgCl_2$ and $ZrO_2$ in a 5.2/94.8 weight ratio.
Figure 6B:
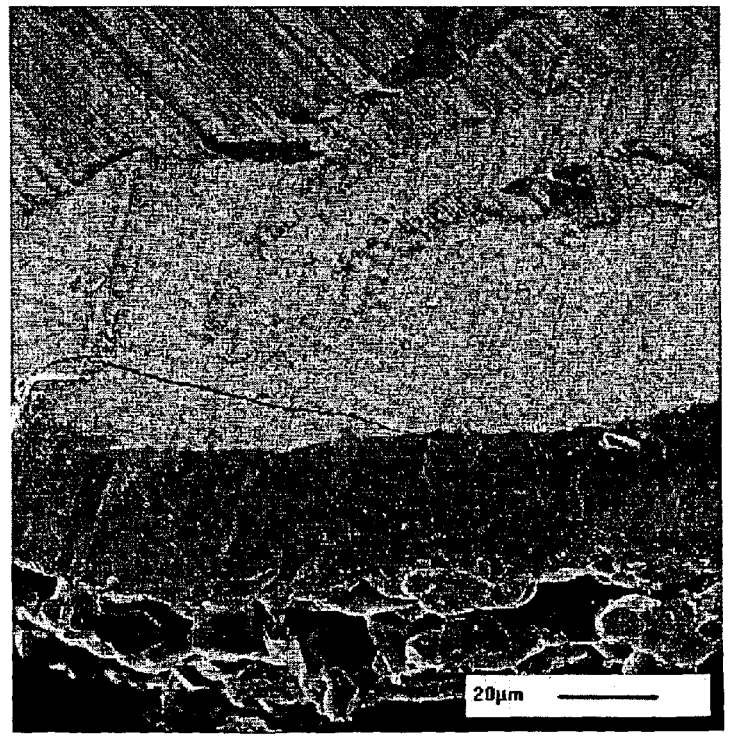
Figure 7A:
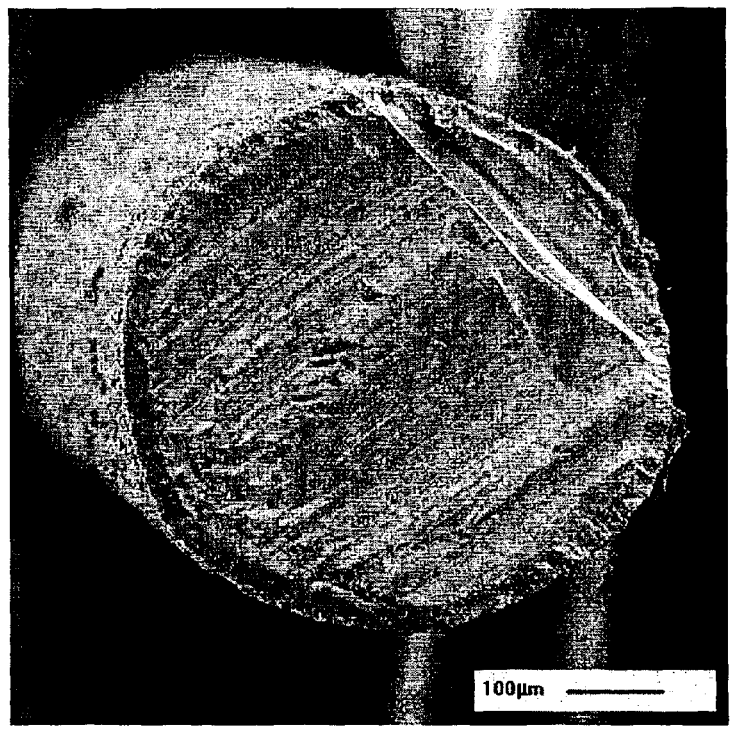
FIG. 7a is a scanning electron photomicrograph of a clad sapphire fiber of the present invention made by pack cementation at 1434° C. in argon for 2 hours using a pack composition of $SrCl_2$ and $ZrO_2$ in a 8.7/91.3 weight ratio.
Figure 7B:
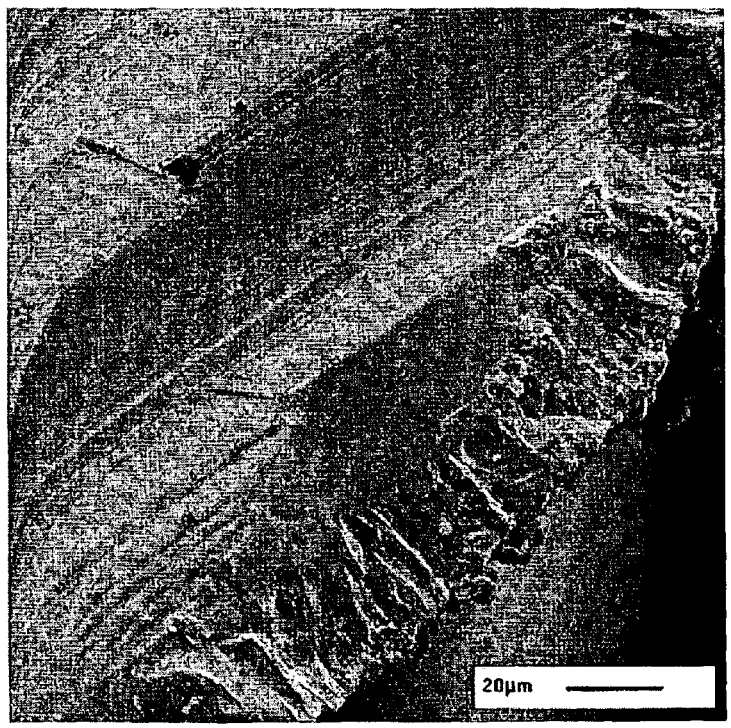

FIGS. 5a, 5b, and 5c are polished section optical micrographs, original magnification 400×, of MgO/ZnO spinel coatings on sapphire fiber showing mixed-spinel (MgO/ZnO aluminate) cladding formation. FIG. 5a shows two coats of 0/81/38.38 MgO/Spinel/ZnO (equivalent to 19/81 MgO/Spinel ratio). FIG. 5b shows two coats of 37.5/25/75.74, MgO/Spinel/ZnO (Equivalent to 75/25 MgO/Spinel ratio). FIG. 5c shows one coat of 37.5/25/75.74, MgO/Spinel/ZnO (equivalent to 75/25 MgO/Spinel ratio).

Moreover, other spinel compositions are suitable for application in the present invention. For example, NiO and CoO spinels are also suitable for the present invention in the same manner as taught herein for MgO spinel. Magnesium aluminate spinel was considered a preferable choice based on several of its physical and chemical properties, including its refractoriness or high melting point, its chemical compatibility with sapphire, and an index of refraction of 1.72. The difference in index of refraction between magnesium aluminate spinel and sapphire is small (0.06). However, this small difference may be considered to be as much as an order of magnitude too large for certain applications, for example, high-temperature clad fiber-optic probes used for optical interferometry. Therefore, it would be advantageous in such cases to modify the index of refraction of the spinel phase upward to reduce the difference in refractive index between the spinel and sapphire.

The index of refraction of the spinel phase can be modified to values from 1.70 to 1.85 by various means, including doping the spinel with cations heavier than magnesium. Such cations can have a valence charge of either +2 or +3. For example, magnesium aluminate spinel can be doped with magnesium chromate and thereby increase the index of refraction thereof. A potential issue is that chromium is soluble in both the spinel phase and the sapphire fiber, and thus may infiltrate the sapphire beyond the limits of the cladding.

Another approach is to substitutionally dope the magnesium +2 ion site in the spinel crystal structure with at least one species such as Zn, Ni, Fe, Mn, Cu, and Co. In the +2 valance state, these ions have an ionic radius similar to that of Mg. $Mg^{+2}$ has a radius of 72 picometers, $Zn^{+2}$ has a radius of 74 picometers, $Cu^{+2}$ has a radius of 73 picometers, $Ni^{+2}$ is has a radius of 69 picometers, and $Co^{+2}$ has a radius 74.5 picometers. Because the radii of these divalent ions are within 15% of that for $Mg^{+2}$, according to Pauling's rules, the can substitute directly for $Mg^{+2}$ in the crystal lattice.

Other methods of producing a spinel-clad sapphire waveguide have been contemplated, for example, displacement reactions conducted in molten Sn having Mg or other elements dissolved in the melt. At the appropriate temperature, the molten Sn will be unreactive with the sapphire fiber. However, the dissolved species such as Mg can readily diffuse to the fiber surface and react with the fiber to form an aluminate spinel cladding.

Moreover, a pack cementation process can be used to produce a spinel-clad sapphire waveguide. Chemical powders that comprise the pack are placed in a reaction vessel along with the sapphire fibers to be clad. The powders comprise essentially the same reactive materials as described hereinabove, with some possible variations. For example, sources of Mg can also include Mg metal powder (for example, with $NH_4Cl$ as a reaction inducer), $MgCl_2$, $Mg(NO_3)_2$, etc. The reactive powders are combined in the pack with essentially inert powders such as $Al_2O_3$ and $ZrO_2$. The amount of the reactive constituent may vary from just greater than 0% by weight to 80%; preferable compositions are from 2% to 30% depending upon the particular reactive species, the expected processing conditions (such as temperature, for example), and desired results (such as cladding thickness, for example).

Upon heating (preferably in an inert atmosphere) to a temperature sufficient to form vapor species and effect a reaction of the powder components with the fibers, a cladding will form on the fiber. Operable temperatures are in the range of 800–2000° C.; preferable temperatures are in the range of 1000–1700° C.; temperatures that are more preferable are in the range of 1200–1600° C. Time of exposure to these temperatures will also have varying effects. Pack cementation processes can be carried out in various atmospheres to achieve varying results.

EXAMPLE VI

Four cementation packs were prepared comprising, respectively, in wt. %, 1. 7.2 $MgCl_2$, 92.8 $Al_2O_3$
2. 9.01 Mg, 1.33 $NH_4Cl$, 89.66 $Al_2O_3$
3. 5.2 $MgCl_2$, 94.8 $ZrO_2$
4. 6.6 Mg, 1.0 $NH_4Cl$, 92.5 $ZrO_2$ Each pack was placed in a graphite crucible along with sapphire fibers embedded therein. The crucibles were heated at 1200° C. in argon for 2 hours. Cladding was observed to have formed on each sample. The thicknesses of the coatings were up to about 15 μm.

EXAMPLE VII

Two cementation packs were prepared comprising, respectively, in wt. %, 1. 5.2 $MgCl_2$, 94.8 $ZrO_2$
2. 8.7 $SrCl_2$, 91.3 $ZrO_2$ Each pack was placed in a graphite crucible along with sapphire fibers embedded therein. The crucibles were heated at 1434° C. in argon for 2 hours.

The results of the samples fabricated as described in Example VII are shown in FIGS. 6a, 6b, 7a, and 7b, respectively. All of the samples have the characteristic core-cladding geometry as observed in Example III and Example IV. The thickness of the spinel coating developed on the sapphire fiber was determined to be between 20 μm and 30 μm.

Figure 8A:
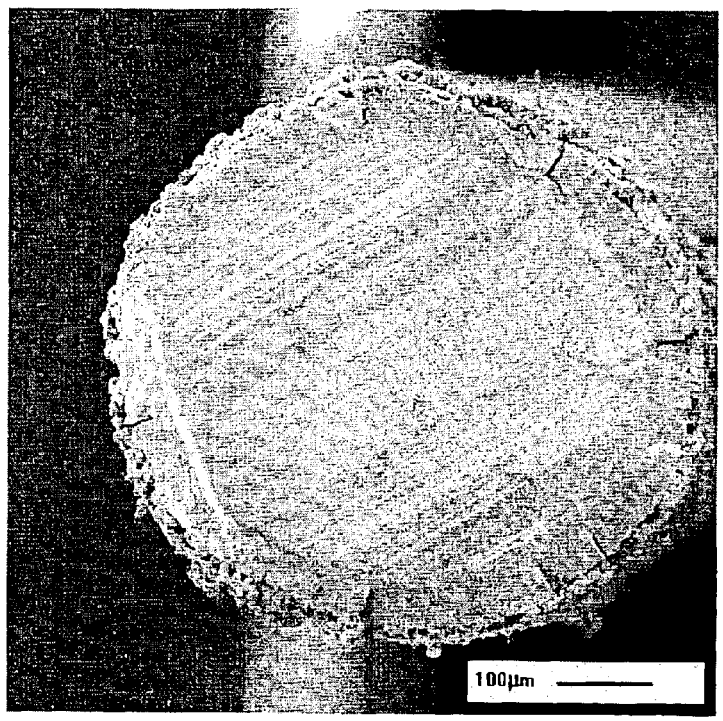
FIGS. 8a and 8b are photomicrographs of clad fibers processed as in FIGS. 6a and 7a, respectively, and subsequently receiving an additional heat treatment at 1600° C. in air for 30 minutes to increase the thickness of the cladding layer.
Figure 8B:
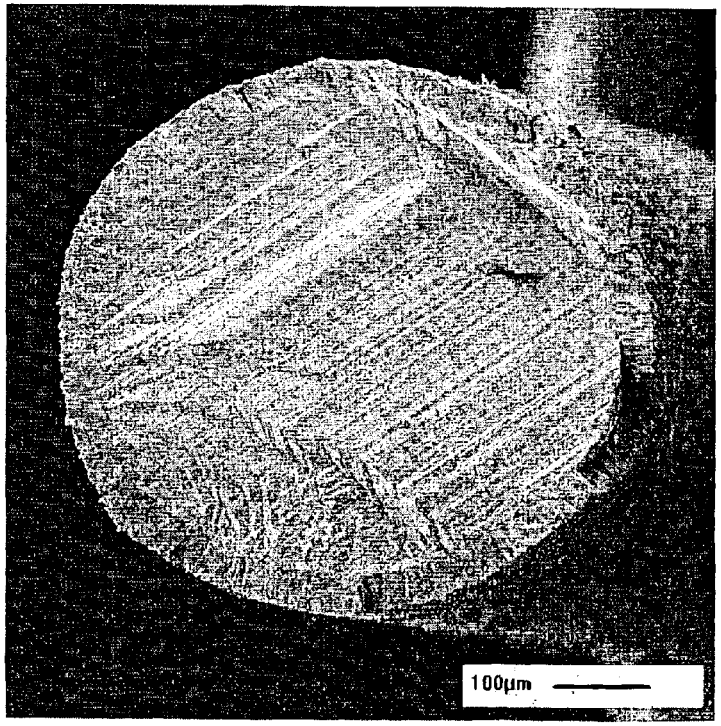

Additionally, it has been demonstrated that the thickness of the cladding layer can be increased by subsequent heat-treating of the fibers after the pack cementation process. Heat-treating can be conducted in air or in an inert atmosphere, and at a temperature in the range of 1200–2000° C., preferably 1400–1800° C., more preferably 1500–1700° C. FIGS. 8a and 8b show the fracture cross-section of fibers coated at 1434° C. as described hereinabove, which were removed from the pack and subsequently heat-treated at 1600° C. in air for 30 minutes. The thickness of the cladding layer was increased significantly.

While the pack cementation methods described in Example VI and Example VII are batch methods, it is possible to conduct essentially the same coating process in a continuous process wherein a sapphire fiber is drawn at an appropriate rate through a heated pack bed. The fiber undergoes a chemical reaction to form a cladding layer while it is resident in the pack.

Another embodiment of a continuous process is the elimination of the pack itself by introducing the reactive constituents directly as gaseous species instead of forming them by volatilization and/or decomposition of the pack chemicals.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. An optical waveguide comprising a sapphire optical waveguide body having thereon a spinel cladding, said spinel cladding being in intimate contact with said sapphire body to reduce the numerical aperture of said sapphire optical waveguide body.

2. An optical waveguide in accordance with claim 1 wherein said spinel cladding comprises a reaction layer of said sapphire body.

3. An optical waveguide in accordance with claim 1 wherein said spinel cladding is characterized by a refractive index in the range of 1.70 to 1.85.

4. An optical waveguide in accordance with claim 1 wherein said spinel cladding comprises magnesium aluminate.

5. An optical waveguide in accordance with claim 1 wherein said spinel cladding comprises at least one element selected from the group consisting of Co, Cr, Cu, Fe, Ga, Mg, Mn, Ni, Sr, and Zn.

6. An optical waveguide in accordance with claim 1 wherein said spinel cladding comprises a solid solution of magnesium aluminate spinel and zinc aluminate spinel.

7. An optical waveguide in accordance with claim 1 wherein said sapphire body comprises a fiber.

* * * * *